United States Patent [19]

Evans, Jr.

[11] 4,049,953
[45] Sept. 20, 1977

[54] COMPLEX PULSE REPETITION FREQUENCY GENERATOR

[75] Inventor: Albert B. Evans, Jr., Ventura, Calif.

[73] Assignee: The United States of America, as represented by the Secretary of the Navy, Washington, D.C.

[21] Appl. No.: 699,820

[22] Filed: June 24, 1976

[51] Int. Cl.² .................. G01S 7/30; G06F 15/20
[52] U.S. Cl. ................... 235/150.3; 307/271; 343/5 DP; 343/17.1 PF
[58] Field of Search ............ 235/150.3, 152, 197, 235/150.53; 307/106, 233, 265, 271; 328/58, 59, 60, 140; 343/5 DP, 17.1 PF

[56] References Cited

U.S. PATENT DOCUMENTS

| 3,054,958 | 9/1962 | Bensky et al. ............... 307/106 X |
| 3,588,898 | 6/1971 | Watters, Jr. et al. ..... 343/17.1 PF X |
| 3,662,386 | 5/1972 | Bryant ........................ 343/17.1 PF |
| 3,702,476 | 11/1972 | Nathanson et al. ........ 343/17.1 PF |
| 3,855,593 | 12/1974 | Van Hijfte et al. ...... 343/17.1 PF X |

Primary Examiner—Joseph F. Ruggiero

Attorney, Agent, or Firm—Richard S. Sciascia; Joseph M. St.Amand; William W. Cochran, II

[57] ABSTRACT

A complex pulse repetition frequency generator for producing a pulse repetition frequency (PRF) signal having programmable stagger intervals. The device consists of a clock for selecting one of a series of standard clock pulses which are used to increment a counter. A comparator compares the accumlated clock pulses with a stagger data output signal produced by a data memory source. When the outputs are equal, the comparator produces a PRF output pulse. Two data memory bands are provided; a random access memory in which stagger data ca be programmed by a series of switches, and a preprogrammed read-only memory. Address counters are used with each memory unit and provide capability for addressing selected memory locations from the data memory sources. A pulse width generator allows the operator to vary the pulse width and utilizes an injection lock oscillator to prevent jitter whenever a standard clock pulse is used which is not an even multiple of a hundred nanoseconds.

13 Claims, 8 Drawing Figures

COMPLEX PULSE REPETITION FREQUENCY GENERATOR

BACKGROUND OF THE INVENTION

The present invention pertains generally to radar systems and more particularly to MTI radar simulators. A basis for MTI radar is the generation of a series of pulses at varying intervals commonly referred to as stagger intervals. Use of these stagger intervals allows the radar apparatus to positively determine range information. For various reasons, it is oftentimes desirable to have the capability to generate any desired pulse repetition frequency signal. For example, to properly test radar jammers, it is necessary to have the ability to apply PRF signals with various stagger intervals to a jammer to evaluate its response. Conventional pulse repetition frequency generators have been unable to produce more and one pulse repetition frequency pattern without requiring a change in the hard wiring of the system. Other systems have provided the capability for varying the stagger intervals but generally have required a multiplicity of delay generators or staggered pulse generators such that the system becomes extremely expensive to generate a variety of pulse repetition frequency signals having a large number of stagger intervals. Essentially, a different pulse generator or delay generator is required for each desired stagger interval. For example, if 256 stagger intervals were desired, 256 separate pulse generators or delay generators would be necwssary to produce the signal using conventional systems. Of course, as the expense and complexity of such a conventional system is increased, its overall reliability is decreased.

SUMMARY OF THE INVENTION

The present invention overcomes these disadvantages and limitations of the prior art by providing an improved complex pulse repetition frequency generator. This is accomplished by the use of a digitally programmable delay generating device which produces pulses in response to a standardized clock. Pulse repetition intervals (PRI) are read from a data memory bank which has been programmed to provide the desired pulse repetition frequency signal. Memory address control is also provided such that any desired portion of the pulse repetition frequency signal can be generated through the selection of a series of controls. Additionally, a pulse width generator provides selection of the desired pulse width and uses an injection lock oscillator to eliminate jitter for clock pulses which are not an even multiple of a hundred nanoseconds.

It is therefore an object of the present invention to provide an improved complex pulse repetition frequency generator.

It is also an object of the present invention to provide a complex pulse repetition frequency generator which is reliable in operation.

Another object of the present invention is to provide a complex pulse repetition frequency generator which is inexpensive to implement.

Another object of the present invention is to provide a complex pulse repetition frequency generator which is capable of providing up to 256 stagger intervals.

Another object of the present invention is to provide a complex pulse repetition frequency generator which allows selection of at least two frames of pulse repetition frequency signal within its pulse repetition interval storage capability.

Other objects and further scope of applicability of the present invention will become apparent from the detailed description given hereinafter. The detailed description, indicating the preferred embodiment of the invention, is given only by way of illustration, since various changes and modifications within the spirit and scope of the invention will become apparent to those skilled in the art from this detailed description. The foregoing abstract of the disclosure is for the purpose of providing a nonlegal brief statement to serve as a searching and scanning tool for scientists, engineers and researchers and is not intended to limit the scope of the invention as disclosed herein nor is it intended to be used in interpreting or in anyway limiting the scope or fair meaning of the appended claims.

DETAILED DESCRIPTION OF THE PREFERRED EMBODIMENT

Figure 1:
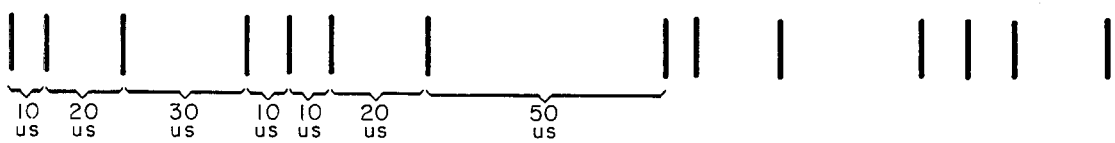
FIG. 1 is a diagrammatic illustration of a pulse repetition frequency signal.

FIG. 1 is an illustration of a pulse repetition frequency signal containing seven pulse repetition intervals. As shown, the PRI's are, in order, 10 microseconds, 20 microseconds, 30 microseconds, 10 microseconds, 10 microseconds, 20 microseconds and 50 microseconds. The stagger intervals are continuously repeated in this order to produce this particular pulse repetition frequency signal. Previous circuits for generating pulse repetition frequency signals, such as shown in FIG. 1, have either been specially designed circuits for generating only one type of pattern or programmable generators, such as shown in FIGS. 2 and 3, which because of their complexity and cost have been incapable of generating more than four levels of stagger intervals.

Figure 2:
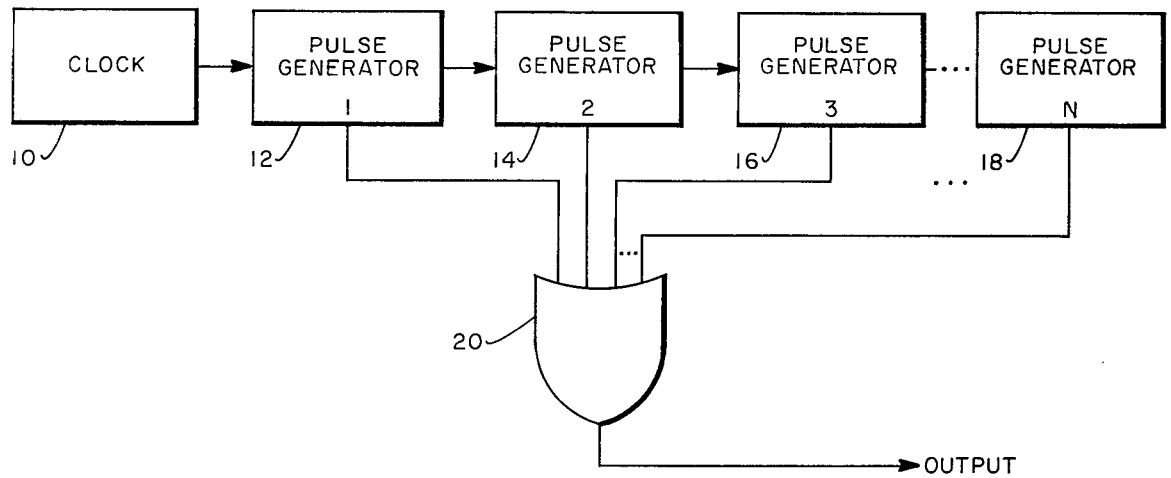
FIG. 2 is a block diagram of one type of prior art device for producing a pulse repetition frequency signal.

The device of FIG. 2 comprises a clock 10 which generates a series of clock pulses which are applied to pulse generator 12 after a specified interval, which can be adjusted within the pulse generator. Pulse generator 12 produces an output which is applied to OR gate 20 and simultaneously applied to pulse generator 14. Similarly, pulse generator 14 produces an output which is also applied to OR gate 20 and pulse generator 16 after a delay interval which has been preselected in the pulse generator. By selecting these delay intervals in the pulse generators 12 thru 18, the desired pulse repetition frequency signal is produced.

Figure 3:
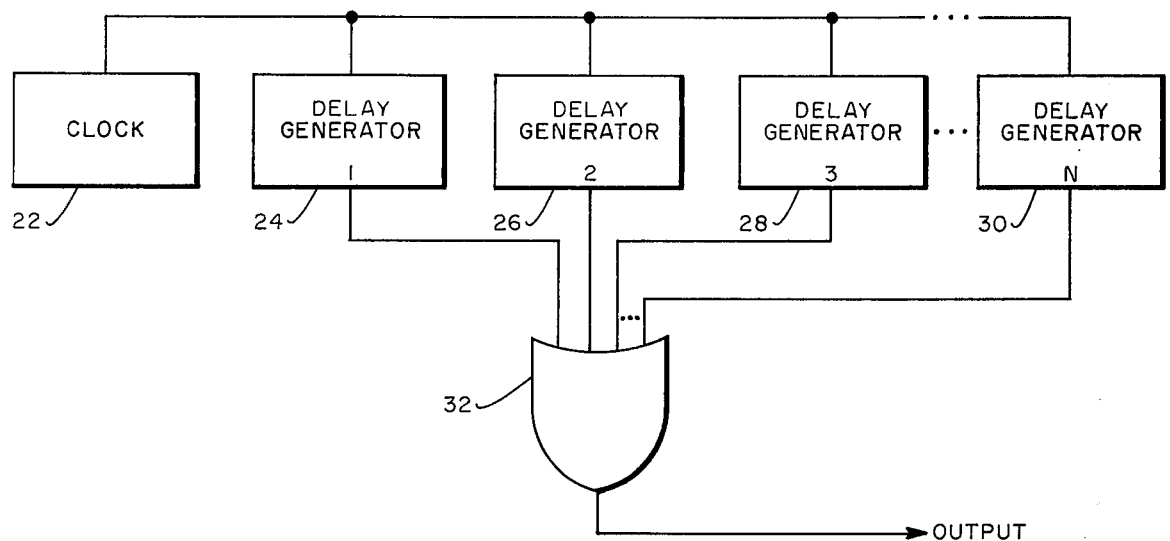
FIG. 3 is a block diagram of a second type of prior art device for producing a pulse repetition frequency signal.

FIG. 3 discloses a different type of conventional pulse repetition frequency generator. Clock 22 produces a series of clock pulses which are applied in parallel to delay generators 24 thru 30. By selecting the desired delay for each of these delay generators, the desired pulse repetition frequency signal is produced at the output of OR gate 32. Again, because of the cost required to produce systems such as shown in FIG. 2 and FIG. 3, programmable complex pulse repetition frequency signal generators have been unable to provide more than four levels of stagger intervals.

Figure 4:
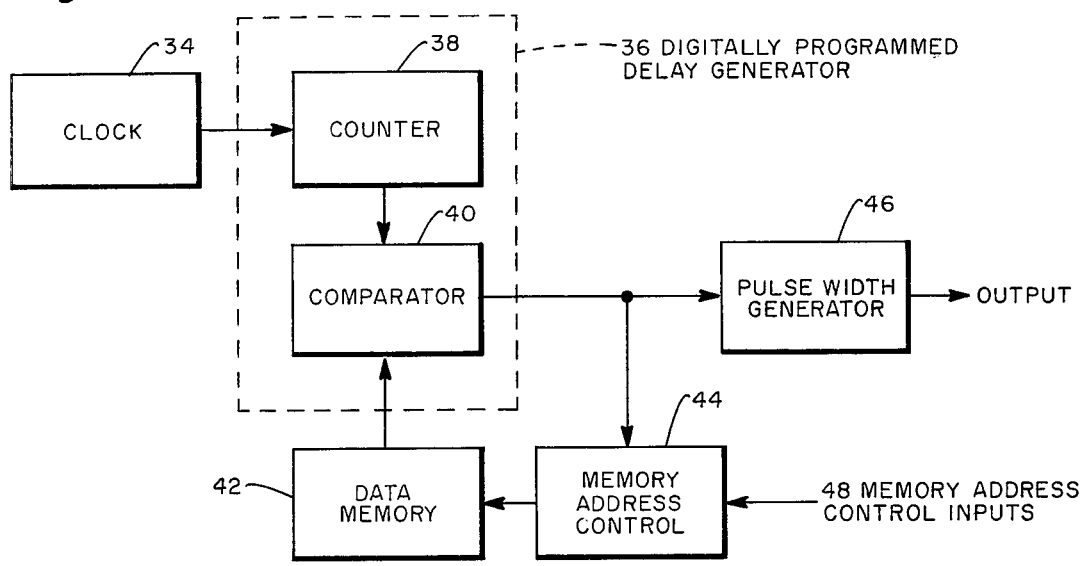
FIG. 4 is a block diagram of the preferred embodiment of the invention.

Turning to FIG. 4, a simplified block diagram of the preferred embodiment of the invention is disclosed. Clock 34 produces one of a series of selectable pulse repetition frequency standards which are applied to digitally programmable delay generator 36 containing a counter 38 and a comparator 40. The counter 38 counts the clock pulses produced by clock 34 and compares them in comparator 40 with the data provided from data memory 42. Upon favorable comparison, an output is produced from the comparator 40 and applied to a pulse width generator 46 which controls the width of the pulse at its output. Memory address control inputs 48 control various functions for the memory address control 44. In general, the memory address control provides signals to address particular memory locations within data memory 42 containing stagger interval data for comparison in comparator 40.

Figure 5:
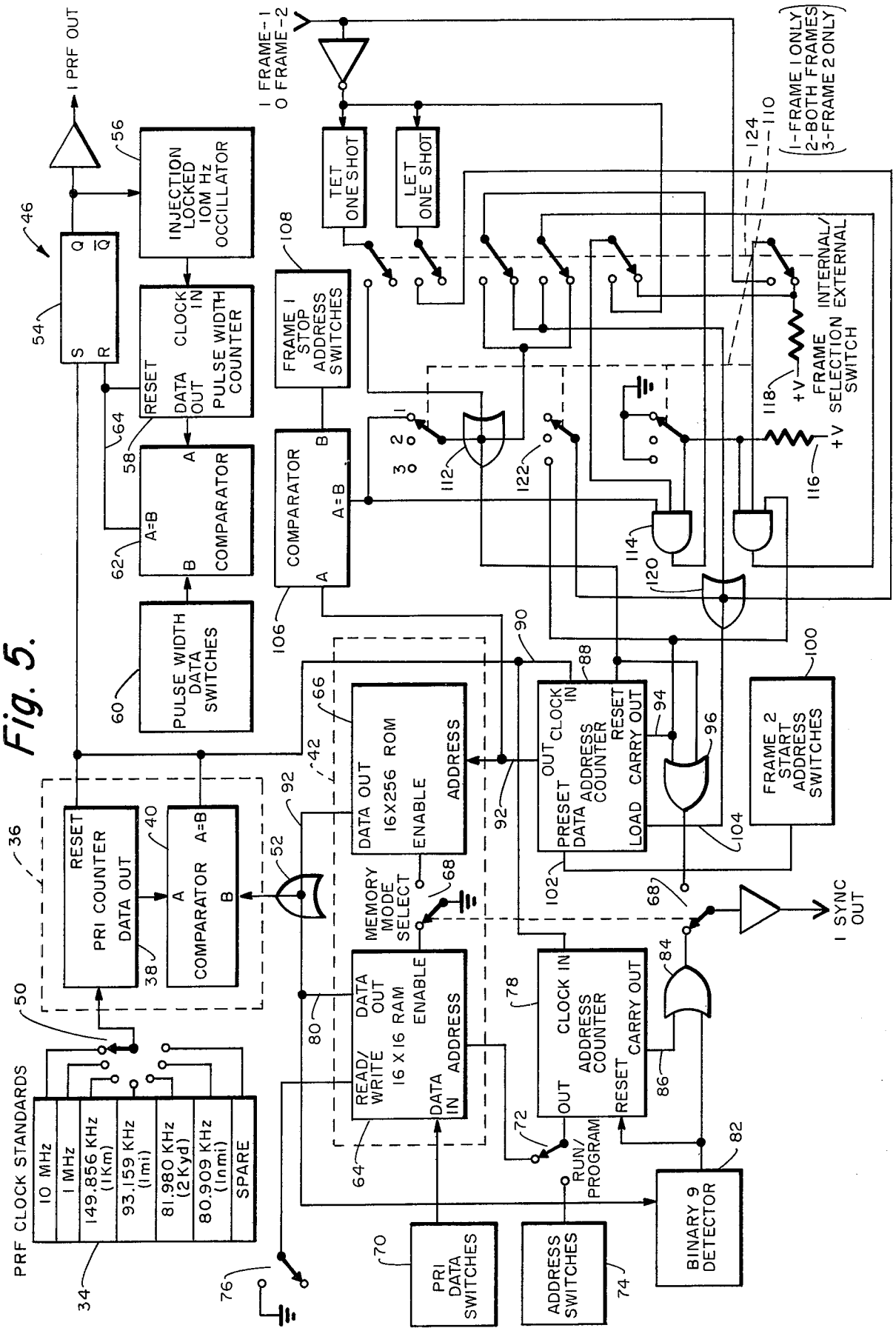
FIG. 5 is a detailed block diagram of the preferred embodiment of the invention.

FIG. 5 discloses in greater detail, the specific operation of the preferred embodiment of the invention. Clock 34 produces a series of MTI radar clock standards which are selectively applied to the digitally programmed delay generator 36 via switch 50. The pulse repetition frequency clock standards supplied by clock 34 comprise a 10 megaHertz signal, a 1 megaHertz signal, a 1 kilometer signal, a 1 mile signal, a 2,000 yard signal, a 1 nautical mile signal and a spare signal. The clock therefore provides any particular desired frequency standard for generating pulse repetition frequency signals. Pulses produced by the clock are applied to a pulse repetition interval counter 38 which sequentially counts clock pulses from the clock 34 until it is reset by the output of comparator 40. The comparator 40 receives the pulse repetition interval count from counter 38 to input A. When that count is equal to the binary number supplied on input B of comparator 40, via OR gate 52, an output is produced. This output resets the counter 38 to zero and applies a set pulse to flip-flop 54 producing an output at Q. This output is the start of a single pulse of the pulse repetition frequency signal. The Q pulse triggers the injection locked oscillator 56 which clocks a pulse width counter 58. A pulse width data switch produces a signal which is used to select the desired pulse width. This signal is applied to the B input of comparator 62 while the accumulated count from the pulse width counter 58 is applied to the A input of comparator 62. When they match, an output pulse is produced on line 64 which is used to reset the pulse width counter 58 and the flip-flop 54. In this manner, the width of the pulse is determined by the data furnished from pulse width data switches 60. The injection locked oscillator 56 is synchronized with the Q pulse signal so that the reset time is constant thereby preventing jitter problems on the following edge of the pulse repetition frequency signal pulses.

The complexity of the pulse repetition frequency generator is provided by the remaining circuitry shown in FIG. 5. Delay interval data is stored in either a 16 × 16 random access memory 64 or a programmable read-only memory 66 comprising the data memory storage 42. The mode selection switch 68 determines which storage medium is addressed. As shown in FIG. 5, the 16 × 16 random access memory 64 is enabled (referred to as mode 16). To program random access memory 64, delay interval data is sequentially read into the 16 address words of the random access memory 64 from the pulse repetition interval data switches 70. This is accomplished by switching the run program switch 72 to connect the address switches 74 to the address input of the random access memory. To enter the stagger interval data, the operator successively addresses locations within the random access memory through the address switches 74 and selects the stagger interval data on PRI data switches 70. For each address, the data is entered by depressing the data enter switch 76. In this manner, the operator can select any pulse repetition frequency signal he so desires.

When the run program switch 72 is switched to the run mode as shown in FIG. 5, the address counter 78 successively counts pulses from the output of comparator 40. This sequentially addresses the random access memory locations which are applied to OR gate 52 via data out channel 80. In the case where less than 16 stagger intervals in the pulse repetition frequency signal are being generated, the operator can program the address counter 78 to reset to zero and, thereafter, repeat its function for the desired number of stagger intervals. This is accomplished by programming the last desired address interval with the data code for a binary 9. The data output signal 80 is applied to a binary 9 detector 82 which detects the presence of the binary 9 in the stagger data interval information and produces an output to reset the counter. This output is applied to an OR gate 84, the output of which is used to provide a synchronization pulse for oscilloscope display. The carry-out signal produced by the address counter 78 constitutes a control pulse which is produced each time the address counter exceeds its maximum count (in this case 16). In the mode 16 position the operator can therefore program the random access memory 64 with as many as 16 stagger intervals and program the device to repeat any preselected number of the 16 intervals depending upon the particular signal he desires.

When the mode selection switch 68 is switched to the read-only memory 66 (256 mode) the read-only memory 66 and address counter 88 are enabled. The address counter 88, in a manner similar to address counter 78, receives clock pulses to increment its count from the comparator 40 via input 90. The address counter applies its accumulated count from its output 92 to the read-only memory 66. Preprogrammed stagger data interval information is applied to OR gate 52 from the data output line 92 which is stored in the locations addressed by the cumulative count from the address counter 92. A carry-out signal produced on output line 94 is similar to the carry-out signal from address counter 78 produced on output line 86. When the address counter reaches its 256 level, a pulse is produced on the output line 94 and applied to OR gate 96. Since the mode selection switch 68 is in the 256 mode, it allows a synchronization output pulse to be produced. A reset pulse is also applied to the OR gate 96 via line 98 which also produces a synchronization output when the address counter is reset to zero.

Figure 6A:
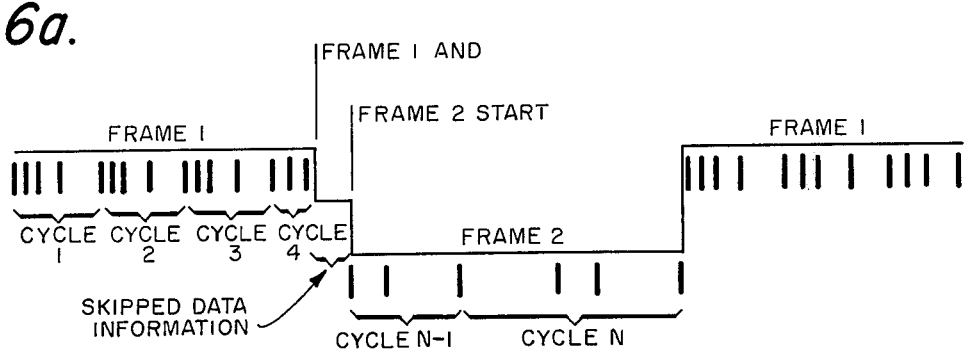
FIG. 6A is a diagram of two frames of pulse repetition frequency signal generated by the device of the preferred embodiment of the invention.
Figure 6B:
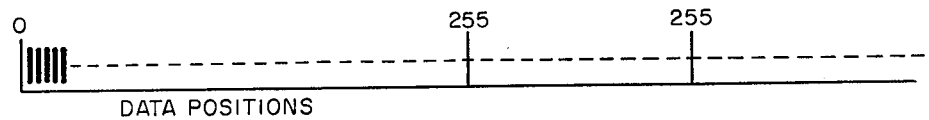
FIG. 6B discloses the horizontal scale parameter for FIG. 6A.
Figure 6C:
FIG. 6C discloses the frame cycles produced in FIG. 6A as a function of time.

The remaining circuitry functions to control frame selection in the 256 mode which can be more clearly understood by referring to FIGS. 6A through 6C. In general, it is desirable to have the capability of switching to more than one type of stagger interval data information signal for any one pulse repetition frequency signal. The 256 data word memory locations of the read-only memory 66 provides sufficient data storage for generating several types of stagger interval data information signals. It is also desirable to have the capability of switching from one signal to another at any desired time regardless of cycle completion. This is provided by placing switch 124 in the external mode.

As shown in FIG. 6A, the first pulse repetition frequency signal is generated during frame 1. An external frame 2 command cuts off the signal without completing its fourth cycle. A frame 2 start function provides a start up time for a second pulse repetition frequency signal. Data positions between the frame 1 end command address and the frame 2 start address are skipped. This is diagrammatically shown in FIG. 6A which illustrates the PRI signal versus the data memory locations within the read-only memory 66. These data memory locations are shown in FIG. 6B. The frame 2 signal is generated to the end of the read-only memory address locations, i.e., the 255 address location. Once again, the address counter is reset to frame 2 start. When frame 1 command is activated, the frame 2 PRF signal is completed to the 255 address. The address counter is then reset to address zero to begin the frame 1 PRF signal. FIG. 6C shows the manner in which the frames are controlled versus time. Since the device switch directly from the end of frame 1 to the beginning of frame 2, the skipped data positions do not produce "dead time" in the output PRF signal.

When switch 124 is placed in the internal position as shown, the frame control function is passed to switch 110. The frame 2 start address switches 100 provide the frame 2 start data address which is applied to the present data input 102. Whenever a pulse is produced on a load input 104, the counter is advanced to the address provided at the preset data input 102. Comparator 106 compares the accumulated address count in input A with the frame 1 stop address signal from 108 on line B. When the address signal from 108 matches the address from the address counter 88, the comparator produces an output pulse which is applied to several different locations depending upon the position of the frame selection switch 110.

When the frame selection switch is in the 1 position as shown in FIG. 5, the address counter only cycles through frame 1 and ignores frame 2. The pulse from the comparator 106 is applied through the switch 110 to OR gate 112 which functions to reset address counter 88 to the zero address position each time the frame 1 stop address is reached such that frame 1 is continuously repeated.

When the frame selection switch 110 is switched to the 2 position, both frames are activated. In this case, a signal is applied from the output of the comparator 106 to AND gate 114. Additionally, the lower input of AND gate 114 is enabled by voltage source 116 as long as switch 110 is in the 2 position. The third input to AND gate 114 is applied from voltage source 118. Since all three inputs to AND gate 114 are enabled, an output pulse is produced which is applied through OR gate 120 causing the address counter to load the address information for frame 2 over line 104. The frame 1 address stop information provided by stop address switch 108 advances the address counter 88 to the frame 2 address start position by applying a signal to the load input 104 as shown in FIG. 6. As the system is set up, the end of frame 2 starts the beginning of frame 1 since the counter is designed to rollover to the zero address position. In this manner only a single cycle of the PRF signal from each frame is generated before the frame is switched.

When the frame selection switch 110 is in the 3 position, only frame 2 information is generated. Again the output of the comparator 106 is applied to AND gate 114. The lower input to the AND gate 114, however, is disenabled to prevent it from producing an output. The middle level 122 of the frame selection switch 110 connects the carry-out signal 94 from address counter 88 to OR gate 120 while in the 3 position. This provides a load signal to start the address counter at the start address for frame 2 each time the address counter reaches the 255 level. This causes the address counter to cycle between the frame 2 start address and the end address (address 255) position.

The present invention therefore provides an inexpensive and simply operated device for programming up to 256 stagger intervals in a single pulse repetition frequency signal. It allows for the selection of multiple patterns on command from a series of frame selection switches. It additionally provides for field programmability through the use of a random access memory providing up to 16 stagger data intervals. It allows selection of one of a series of standard radar clock pulse signals such that it will be compatible with most known radar frequency standards.

Obviously many modifications and variations of the present invention are possible in the light of the above teachings. It is therefore to be understood within the scope of the appended claims the invention may be practiced otherwise than as specifically described.

What is claimed is:

1. A complex pulse repetition frequency generator for generating a pulse repetition frequency signal having programmable stagger intervals comprising:
   a. clock means for generating a plurality of standard clock frequency signals;
   b. memory address control means for generating a plurality of memory address signal sequences, each said memory address signal sequence having a start address and a stop address;
   c. data memory means for producing a series of stagger data pulses in response to each said memory address signal sequence; and,
   d. digitally programmable delay generating means for producing a pulse repetition frequency signal having stagger intervals generated in response to said series of stagger data pulses and to said clock frequency signals.

2. The generator of claim 1 further comprising pulse width generating means for controlling pulse width of said pulse repetition frequency signal.

3. The generator of claim 1 wherein said digitally programmable delay generating means comprises:
   a. counter means for producing an output signal representative of an accumulated count of said clock frequency signals;
   b. means for comparing said accumulated count from said counter means with said series of stagger data pulses.

4. The generator of claim 1 wherein said memory address control means comprises address counter means for accumulating pulses from said pulse repetition frequency signal to generate said plurality of memory address signal sequences.

5. The generator of claim 4 wherein said memory address control means further comprises means for detecting a preselected address signal to reset said address counter means to zero.

6. The generator of claim 5 wherein said means for detecting a preselected address signal comprises:
 a. means for generating an address stop signal;
 b. means for comparing said address stop signal with said memory address signal.

7. The generator of claim 1 wherein said data memory means comprises a programmable read-only memory.

8. The generator of claim 2 wherein said pulse width generating means comprises:
 a. a pulse width data generator;
 b. injection oscillation means for producing clock pulses in synchronization with said standard clock frequency signals;
 c. means for counting said clock pulses; and,
 d. means for comparing said counted clock pulses with a data signal generated by said pulse width data generator to produce a reset pulse in a flip-flop.

9. The generator of claim 1 wherein said control means further comprises means for switching from one memory address signal sequence to another memory address signal sequence.

10. The generator of claim 9 wherein said switching means, when switching from one memory address signal sequence to another memory address signal sequence, switches to said start address of said another memory address signal sequence.

11. The generator of claim 9 wherein said switch means includes:
 a. a plurality of start address switches, one each for a respective memory address signal sequence;
 b. a plurality of stop address switches, one each for a respective memory address signal sequence;
 c. a plurality of comparators, responsive to a respective stop address switch and to said memory address signal sequences, for generating a control signal when said respective memory address signal sequence terminates;
 d. address counter means, responsive to said start address switches and to said control signal, for generating the next memory address signal sequence.

12. The generator of claim 11 further comprising multiposition frame switch means responsive to said control signal and to said address counter means for providing manual switching to said start address of a specific memory address signal sequence.

13. The generator of claim 1 wherein said plurality of memory address signal sequences include two memory address signal sequences.

* * * * *